(12) United States Patent
Modha

(10) Patent No.: US 9,959,501 B2
(45) Date of Patent: *May 1, 2018

(54) STRUCTURAL DESCRIPTIONS FOR NEUROSYNAPTIC NETWORKS

(71) Applicant: International Business Machines Corporation, Armonk, NY (US)

(72) Inventor: Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/418,609

(22) Filed: Jan. 27, 2017

(65) Prior Publication Data

US 2017/0140267 A1 May 18, 2017

Related U.S. Application Data

(63) Continuation of application No. 14/995,506, filed on Jan. 14, 2016, now Pat. No. 9,600,761, which is a continuation of application No. 13/791,505, filed on Mar. 8, 2013, now Pat. No. 9,262,712.

(51) Int. Cl.
  *G06N 3/063* (2006.01)
  *G06N 3/04* (2006.01)

(52) U.S. Cl.
  CPC ............... *G06N 3/063* (2013.01); *G06N 3/04* (2013.01)

(58) Field of Classification Search
  None
  See application file for complete search history.

(56) References Cited

U.S. PATENT DOCUMENTS

| | | | |
|---|---|---|---|
| 6,269,353 B1 * | 7/2001 | Sethi | G06N 3/02 |
| | | | 706/20 |
| 6,463,438 B1 | 10/2002 | Veltri | |
| 6,622,135 B1 | 9/2003 | Imbert De Tremiolles et al. | |
| 6,990,444 B2 | 1/2006 | Hind et al. | |
| 7,016,887 B2 | 3/2006 | Stockfisch | |
| 7,089,592 B2 | 8/2006 | Adjaoute | |

(Continued)

FOREIGN PATENT DOCUMENTS

WO  2013043610 A1  3/2013

OTHER PUBLICATIONS

Preissl et al., "Compass: A Scalable Simulator for an Architecture for Cognitive Computing", Nov. 10-16, 2012, pp. 1-11.*

(Continued)

*Primary Examiner* — Paulinho E Smith
(74) *Attorney, Agent, or Firm* — Sherman IP LLP; Kenneth L. Sherman; Hemavathy Perumal

(57) ABSTRACT

Embodiments of the invention provide a method comprising creating a structural description for at least one neurosynaptic core circuit. Each core circuit comprises an interconnect network including plural electronic synapses for interconnecting one or more electronic neurons with one or more electronic axons. The structural description defines a desired neuronal activity for the core circuits. The desired neuronal activity is simulated by programming the core circuits with the structural description. The structural description controls routing of neuronal firing events for the core circuits.

10 Claims, 12 Drawing Sheets

(56) References Cited

U.S. PATENT DOCUMENTS

| | | |
|---|---|---|
| 7,814,038 B1 | 10/2010 | Repici |
| 7,904,398 B1 | 3/2011 | Repici |
| 7,953,221 B2 | 5/2011 | Feghali et al. |
| 8,332,340 B2* | 12/2012 | Snider .............. G06N 3/0635 706/38 |
| 8,429,107 B2 | 4/2013 | Denneau et al. |
| 8,515,885 B2 | 8/2013 | Modha |
| 8,683,216 B2 | 3/2014 | Harmonen |
| 8,712,941 B2 | 4/2014 | Izhikevich et al. |
| 8,812,414 B2 | 8/2014 | Arthur et al. |
| 8,868,477 B2 | 10/2014 | Esser et al. |
| 8,904,347 B2 | 12/2014 | Miloushev et al. |
| 8,909,576 B2 | 12/2014 | Akopyan et al. |
| 8,977,583 B2 | 3/2015 | Modha |
| 8,990,130 B2 | 3/2015 | Alvarez-Icaza Rivera et al. |
| 8,996,430 B2 | 3/2015 | Modha |
| 9,020,867 B2 | 4/2015 | Esser |
| 9,152,486 B2 | 10/2015 | Bird |
| 9,164,737 B2 | 10/2015 | Nathan et al. |
| 9,165,242 B2 | 10/2015 | Park |
| 9,412,063 B2 | 8/2016 | Appuswamy et al. |
| 9,489,622 B2 | 11/2016 | Modha |
| 9,524,462 B2 | 12/2016 | Esser et al. |
| 9,563,841 B2 | 2/2017 | Alvarez-Icaza Rivera et al. |
| 9,639,802 B2 | 5/2017 | Modha |
| 9,665,822 B2 | 5/2017 | Esser et al. |
| 9,697,461 B2 | 7/2017 | Modha |
| 9,747,545 B2 | 8/2017 | Akopyan et al. |
| 9,798,972 B2 | 10/2017 | Appuswamy et al. |
| 9,818,058 B2 | 11/2017 | Arthur et al. |
| 9,852,006 B2 | 12/2017 | Akopyan et al. |
| 2002/0087499 A1* | 7/2002 | Stockfisch .............. G06N 5/025 706/59 |
| 2002/0133721 A1* | 9/2002 | Adjaoute .............. G06Q 20/04 726/23 |
| 2011/0004579 A1* | 1/2011 | Snider .............. G06N 3/063 706/25 |
| 2011/0106741 A1* | 5/2011 | Denneau .............. H04L 47/521 706/25 |
| 2012/0016829 A1 | 1/2012 | Snider |
| 2012/0084241 A1 | 4/2012 | Friedman et al. |
| 2013/0031040 A1* | 1/2013 | Modha .............. G06N 3/049 706/27 |
| 2013/0073484 A1 | 3/2013 | Izhikevich et al. |
| 2013/0073496 A1 | 3/2013 | Szatmary et al. |
| 2013/0073497 A1* | 3/2013 | Akopyan .............. G06N 3/049 706/27 |
| 2013/0218821 A1 | 8/2013 | Szatmary et al. |
| 2013/0232430 A1 | 9/2013 | Reitan |
| 2014/0019392 A1 | 1/2014 | Buibas |
| 2014/0032464 A1* | 1/2014 | Esser .............. G06N 3/063 706/26 |
| 2014/0032465 A1* | 1/2014 | Modha .............. G06N 3/04 706/27 |
| 2014/0052679 A1 | 2/2014 | Sinyavskiy et al. |
| 2014/0114893 A1* | 4/2014 | Arthur .............. G11C 11/54 706/25 |
| 2014/0180987 A1* | 6/2014 | Arthur .............. G06N 3/049 706/25 |
| 2014/0258199 A1* | 9/2014 | Modha .............. G06N 3/02 706/26 |
| 2014/0280075 A1 | 9/2014 | Huang et al. |
| 2015/0058268 A1* | 2/2015 | Modha .............. G06N 3/049 706/27 |
| 2016/0125289 A1 | 5/2016 | Amir et al. |
| 2016/0247062 A1 | 8/2016 | Amir |
| 2016/0275395 A1 | 9/2016 | Amir |
| 2016/0283840 A1 | 9/2016 | Amir |
| 2016/0335535 A1 | 11/2016 | Amir |
| 2017/0017876 A1 | 1/2017 | Modha |

OTHER PUBLICATIONS

International Search Report and Written Opinion dated Oct. 8, 2014 for International Application No. PCT/EP2014/051215 from European Patent Office, pp. 1-15, Rijswijk, Netherlands.

Preissl, R. et al., "Compass; A scalable simulator for an architecture for Cognitive Computing", Proceedings of the 2012 International Conference for High Performance Computing, Networking, Storage and Analysis (SC), Nov. 10-16, 2012, pp. 1-11, IEEE, United States.

Gleeson, P. et al., "NeuroML: A Language for Describing Data Driven Models of Neurons and Networks with a High Degree of Biological Detail", Jun. 17, 2010, PLOS Computational Biology, pp, 1-19, vol. 6, Issue 6, United States.

Arthur, J.V. et al., "Building Block of a Programmable Neuromorphic Substrate: A Digital Neurosynaptic Core", Proceedings of the 2012 World Congress on Computational Intelligence (WCCI), Jun. 10-15, 2012, IEEE, United States.

Munipalli, S.K., "An FPGA Implementation of a High Performance AER Packet Network", Jan. 1, 2013, Scholar Dissertations and Theses, pp. 1-105, Portland State University, PDXScholar, United States.

Cassidy, A.S. et al., "Cognitive Computing Building Block: A Versatile and Efficient Digital Neuron Model for Neurosynaptic Cores", Proceedings of the 2013 International Joint Conference on Neural Networks, 2013, pp. 1-10, IEEE, United States.

Wendt, K. et al., GMPath—A Path Language for Navigation, Information Query and Modification of Data Graphs, Proceedings of the 2010 6th International Workshop Artificial Neural Networks and Intelligent Information Processing (ANNIP 2010), 2010, pp. 33-42, United States.

Ehrlich, M. et al., "A software framework for mapping neural networks to a wafer-scale neurornorphic hardware system", Proceedings of the 2010 Artificial Neural Networks and Intelligent Information Processing Conference, 2010, 1-10, United States.

Rodriguez, A., et al., "Migrating Subarea Networks to an IP Infrastructure Using Enterprise Extender", IBM.COM/Redbooks, Aug. 2000, pp. 1-276, IBM, United States.

Corneil, D. et al., "Real-time inference in a VLSI spiking neural network", Proceedings of the 2012 International Symposium on Circuits and Systems (ISCAS), May 20-23, 2012, pp, 2425-2428, IEEE, United States.

Brette, R. et al., "Simulation of networks of spiking neurons: A review of tools and strategies", J. of Computational Neuroscience, Apr. 12, 2007, pp. 1-50, Springer Science, United States.

Djurfeldt, M., "The Connection-set Algebra—A Novel Formalism for the Representation of Connectivity Structure in Neuronal Network Models", Neuroinformatics, Mar. 23, 2012, pp. 287-304, vol. 10, Issue 3, Springer, United States.

Zoeter, O., "A new approximate inference method for spike and slab model: expectation propagation with a replication trick", May 9, 2013, pp. 1-13, IP.com, United States.

Fox, G.C., et al., "Load Balancing by a Neural Network", Oct. 31, 1986, pp. 1-55. IP.com, United States.

Chakrabarti, D. et al., "Fully Automatic Cross-Associations", Proceedings of the 10th ACM SIGKDD International Conference on Knowledge discovery and data mining (KDD '04), Aug. 22, 2004, pp. 79-88, ACM, United States Neuflow, "An embedded eye, in your hands", http://www.neuflow.org/, Feb. 6, 2012, p. 1-3, downloaded Feb. 13, 2015, United States.

Esser, S.K. et al., "Cognitive Computing Systems: Algorithms and Applications for Networks for Neurosynaptic Cores", 2013, pp. 1-10, IBM, United States.

IBM, "IBM creates new foundation to program SyNAPSE chips inspired by human brain", Phys. Org., Aug. 28, 2013, pp. 1-3, IBM, United States.

Booton, J., "After Watson, IBM Looks to Build 'Brain in a Box'", FOXBusiness, Aug. 22, 2013, pp. 1-2, United States.

Amir, A., et al., "Cognitive Computing Programming Paradigm: A Corelet Language for Composing Networks of Neurosynaptic

(56) References Cited

OTHER PUBLICATIONS

Cores" in International Joint Conference on Neural Networks (IJCNN), 2013, p. 1-10, IEEE, United States.

Green, T.R.G. et al., "Usability Analysis of Visual Programming Environments: a 'cognitive dimensions' framework," Journal of Visual Languages and Computing, Jun. 1996, pp. 131-174, v. 7, issue 2, Elsevier, United States.

Nengo, "Nengo Neural Simulator", http://www.nengo.ca/, downloaded Feb. 13, 2015, p. 1-2, United States.

International Search Report and Written Opinion dated Apr. 29, 2016 for International Application No. PCT/EP2016/051334 from European Patent Office, pp. 1-12, Rijswijk, Netherlands.

Plesser, H.E. et al., "Efficient Parallel Simulation of Large-Scale Neuronal Networks on Clusters of Multiprocessor Computers", Proceedings in the 13th International Euro-Par Conference, Lecture Notes in Computer Science, Aug. 28, 2007, pp. 672-681, vol. 4641, France.

Djurfeldt, M., "Efficient generation of connectivity in neuronal networks from simulator-independent descriptions", Frontiers in Neuroinformatics, Apr. 22, 2014, pp. 1-12, vol. 8, Article 43, United States.

Minkovich,K, et al., "Programming Time-Multiplexed Reconfigurable Hardware Using a Scalable Neuromporhic Compiler", Proceedings of the IEEE Transaction on Neural Networks and Learning Systems, Jun. 212, pp. 889-900, vol. 23, No. 6, United States Galluppi, F. et al., "A Hierachical Configuration System for a Massively Parallel Hardware Platform", Proceedings of the 9th Conference on Computing Frontiers (CF '12), May 15, 2012, pp. 183-192, United States.

Wendt, K. et al., "A graph theoretical approach for a multistep mapping software for the FACETS project", Proceedings of the 2nd WSEAS International Conference on Computer Engineering and Applications (CEA'08), Jan. 25, 2008, pp. 189-194, Mexico.

Eichner, H. et al., "Neural simulations on multi-core architectures", Frontiers in Neuroinformatics, Jul. 9, 2009, pp. 1-15, vol. 3, Article 21, United States.

U.S. Non-Final Office Action for U.S. Appl. No. 13/791,505 dated May 12, 2015.

U.S. Notice of Allowance for U.S. Appl. No. 13/791,505 dated Oct. 15, 2015.

U.S. Non-Final Office Action for U.S. Appl. No. 14/626,677 dated Feb. 19, 2016.

U.S. Final Office Action for U.S. Appl. No. 14/626,677 dated Jul. 1, 2016.

U.S. Advisory Action for U.S. Appl. No. 14/626,677 dated Oct. 3, 2016.

U.S. Non-Final Office Action for U.S. Appl. No. 14/995,506 dated Jul. 14, 2016.

U.S. Notice of Allowance for U.S. Appl. No. 14/995,506 dated Nov. 9, 2016.

Extended European Search Report dated Feb. 8, 2017 for European Application No. 16152389.9 from European Patent Office, pp. 1-13, Munich, Germany.

Liiv, I., "Seriation and Matrix Reordering Methods: An Histroical Overview", Statistical Analysis and Data Mining, Mar. 11, 2010, pp, 70-91, vol. 3, No, 2, Wiley InterScience, United States.

U.S. Notice of Allowance for U.S. Appl. No. 14/626,677 dated Mar. 9, 2017.

Sporns, O. et al. "Organization, Development and Function of Complex Brain Networks"; Trends in Cognitive Sciences, Sep. 2004, pp. 418-425, vol. 8, No. 9, Elsevier, United States.

Rempis, C. W. et al., "Search Space Restriction of Neuro-evolution through Constrained Modularization of Neural Networks", Proceedings of the 6th international Workshop on Artificial Neural Networks and Intelligent Information Processing (ANNIIP), Jun. 2010. pp. 13-22, SciTePress, Madeira, Portugal.

Miller, B. et al., "Embedding-Based Placement of Processing Element Networks on FPGAs for Physical Model Simulation", Proceedings of the ACM/SIGDA International Symposium on Field programmable gate arrays (FPGA '13), Feb. 11-13, 2013, pp. 181-190, ACM, United States.

Wang, R. M. et al. "A Mixed-Signal Implementation of a Polychronous Spiking Neural Network with Delay Adaptation.". Frontiers in Neuroscience, Mar. 18, 2014, pp. 1-16, vol. 8, Art. 51, PMC, United States.

Misra. J. et al., "Artificial Neural Networks in Hardware: A Survey of Two Decades of Progress", Neurocomputing, Dec. 2010, pp. 239-255, vol. 74, No. 1, Elsevier, United States.

Wang, F. et al., "A Hierarchical Neural Network Approach to the Development of a Library of Neural Models for Microwave Design", IEEE Transactions on Microwave Theory and Techniques, Dec. 1998, pp. 2391-2403, vol. 46, No. 12, IEEE Press, United States.

Hidaka, S. et al., "Towards a Compositional Approach to Model Transformation for Software Development", Proceedings of the 2009 ACM symposium on Applied Computing, Mar. 9-12, 2009, pp. 468-475, ACM, United States.

Biggerstaff, T.J. et al., "The Library Scaling Problem the Limits Concrete Component Reuse", Proceedings of the 3rd International Conference Software Reuse, Nov. 1-4, 1994, pp. 102-109, IEEE, United States.

Shaw, B. et al., "Cognitive Computing Commercialization: Boundary Objects for Communication", Proceedings of the 3rd International Conference of Design Engineering and Management for Innovation, Sep. 4-6, 2013, pp. 1-10, IBM, United States.

Kumazawa, I. et al., "A Learning Scheme for Bipartite Recurrent Networks and Its Performance", Proceedings in the 1993 First New Zealand International Two-Stream Conference on Artificial Neural Networks and Expert Systems, Nov. 24-26, 1993, pp. 34-37, IEEE, United States.

Zhang, C. et al,, "A Saturation Binary Neural Network for Bipartite Subgraph Problem", Proceeding in the ICIC'11 Proceedings of the 7th International Conference on Intelligent Computing: Bio-Inspired Computing and Applications, 2012, pp. 64-70, vol. 6840, Springer, Berlin.

Hikada, S. et al., "Towards a Compositional Approach to Model Transformation for Software Development" Proceedings of the 2009 ACM Symposium on Applied Computing, Mar. 8, 2009, pp. 468-475, ACM, United States.

Esser, S.K. et al., "Cognative Computing Systems: Algorithims and Applications for Networks of Neurosynaptic Cores" Proceedings of the 2013 International Joint Conference on Neural Networks (IJCNN), Aug. 4, 2013, pp. 1-10, IEEE, United States.

Imam et al., "A Digital Neurosynaptic Core Using Event-Driven QDI Circuits", Proceedings of the 18th IEEE International Symposium on Asynchronous Circuits and Systems, May 1, 2012, pp. 1-8, IEEE, United States.

U.S. Non-Final Office Action for U.S. Appl. No. 14/528,885 dated Apr. 21, 2017.

U.S. Notice of Allowance for U.S. Appl. No. 14/528,885 dated Aug. 16, 2017.

U.S. Appl. No. 15/418,609, dated Aug. 11, 2015, He, S. et al.

Bruderle, D. et al., "A comprehensive workflow for general-purpose neural modeling with highly configurable neuromorphic hardware systems", Biological Cybernetics, Nov. 10, 2011, pp. 263-296, vol. 104, Springer-Verlag, Berlin, Germany.

Sporns, O., et al. "Theoretical neuroanatomy: relating anatomical and functional connectivity in graphs and cortical connection matrices", Cerebral Cortex, Feb. 1, 2000, pp. 127-141, vol. 10, No. 2, Oxford University Press, United Kingdom.

Siirtola, H. et al., "Constructing and reconstructing the reorderable matrix", Information Visualization, Feb. 3, 2005, pp. 32-48, vol. 4, No. 1, Palgrave Journals, United Kingdom.

Gemulla, R. et al., "Large-scale matrix factorization with distributed stochastic gradient descent", Proceedings of the 17th ACM SIGKDD International Conference on Knowledge Discovery and Data Mining, Mar. 16, 2011, pp. 1-49, ACM, United States.

Shukla, R. et al., "Evaluating hopfield-network-based linear solvers for hardware constrained neural substrates", Proceeding from the 2017 International Joint Conference on Neural Networkds (IJCNN), 2017, pp. 3938-3945, IEEE, United States.

(56) References Cited

OTHER PUBLICATIONS

Such, F.P. et al., "Robust Spatial Filtering With Graph Convolutional Neural Networks", IEEE Journal of Selected Topics in Signal Procesing, Sep. 2017, pp. 884-896, vol. 11, No. 6, IEEE, United States.
Diehl, P.U. et al., "Conversion of Artificial Recurrent Neural Networks to Spiking Neural Networks for Low-power Neuromorphic Hardware", Proceedings from the 2016 IEEE International Conference on Rebooting Computing (ICRC), 2016, pp. 1-6, IEEE, United States.
Wang, H. et al., "Locality-Preserved Maximum Information Projection", IEEE Transactions on Neural Networks, Apr. 2008, pp. 571-585, vol. 19, No. 4, IEEE, United States.
U.S. Non-Final Office Action for U.S. Appl. No. 14/662,096 dated Dec. 6, 2017.
U.S. Notice of Allowance for U.S. Appl. No. 14/662,115 dated Jan. 12, 2018.
U.S. Corrected Notice of Allowability for U.S. Appl. No. 14/669,575 dated Feb. 9, 2018.
U.S. Corrected Notice of Allowability for U.S. Appl. No. 14/669,575 dated Jan. 29, 2018.
U.S. Notice of Allowance for U.S. Appl. No. 14/669,575 dated Jan. 9, 2018.

* cited by examiner

| Input Mapping Table ||
|---|---|
| Corelet Input | Sub-Corelet Input |
| $Input_0$ | $Input_0$ of $SC_1$ |
| $Input_1$ | $Input_0$ of $SC_0$ |
| $Input_2$ | $Input_1$ of $SC_0$ |
| . | . |
| . | . |
| $Input_{I-1}$ | $Input_{m-1}$ of $SC_{C-1}$ |

| Output Mapping Table ||
|---|---|
| Sub-Corelet Output | Corelet Input |
| $Output_0$ of $SC_0$ | $Output_0$ |
| $Output_1$ of $SC_0$ | $Input_{m-1}$ of $SC_1$ |
| . | . |
| . | . |
| $Output_{n-1}$ of $SC_0$ | $Input_1$ of $SC_1$ |
| $Output_0$ of $SC_1$ | $Input_{m-1}$ of $SC_0$ |
| $Output_1$ of $SC_1$ | $Output_1$ |
| . | . |
| . | . |
| $Output_{n-1}$ of $SC_1$ | $Output_2$ |
| . | . |
| . | . |
| $Output_0$ of $SC_{C-1}$ | $Output_{O-1}$ |
| . | . |
| . | . |
| $Output_{n-1}$ of $SC_{C-1}$ | $Input_1$ of $SC_{C-1}$ |

FIG. 11

STRUCTURAL DESCRIPTIONS FOR NEUROSYNAPTIC NETWORKS

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in particular, structural descriptions for neurosynaptic networks.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

SUMMARY

In one embodiment, the present invention provides a method comprising creating a structural description for at least one neurosynaptic core circuit. Each core circuit comprises an interconnect network including plural electronic synapses for interconnecting one or more electronic neurons with one or more electronic axons. The structural description defines a desired neuronal activity for the core circuits. The desired neuronal activity is simulated by programming the core circuits with the structural description. The structural description controls routing of neuronal firing events for the core circuits.

Another embodiment comprises a framework including at least one structural description for programming a neural network including multiple interconnected neural core circuits, wherein each core circuit comprises an interconnect network including plural electronic synapses for interconnecting one or more electronic neurons with one or more electronic axons. Each structural description defines a desired neuronal activity for at least one core circuit of the neural network. Each structural description controls the routing of neuronal firing events propagating through the neural network.

These and other features, aspects, and advantages of the present invention will become understood with reference to the following description, appended claims, and accompanying figures.

BRIEF DESCRIPTION OF THE DRAWINGS

FIG. 10 illustrates an example input mapping table, in accordance with an embodiment of the invention;

FIG. 11 illustrates an example output mapping table, in accordance with an embodiment of the invention;

DETAILED DESCRIPTION

Figure 1:
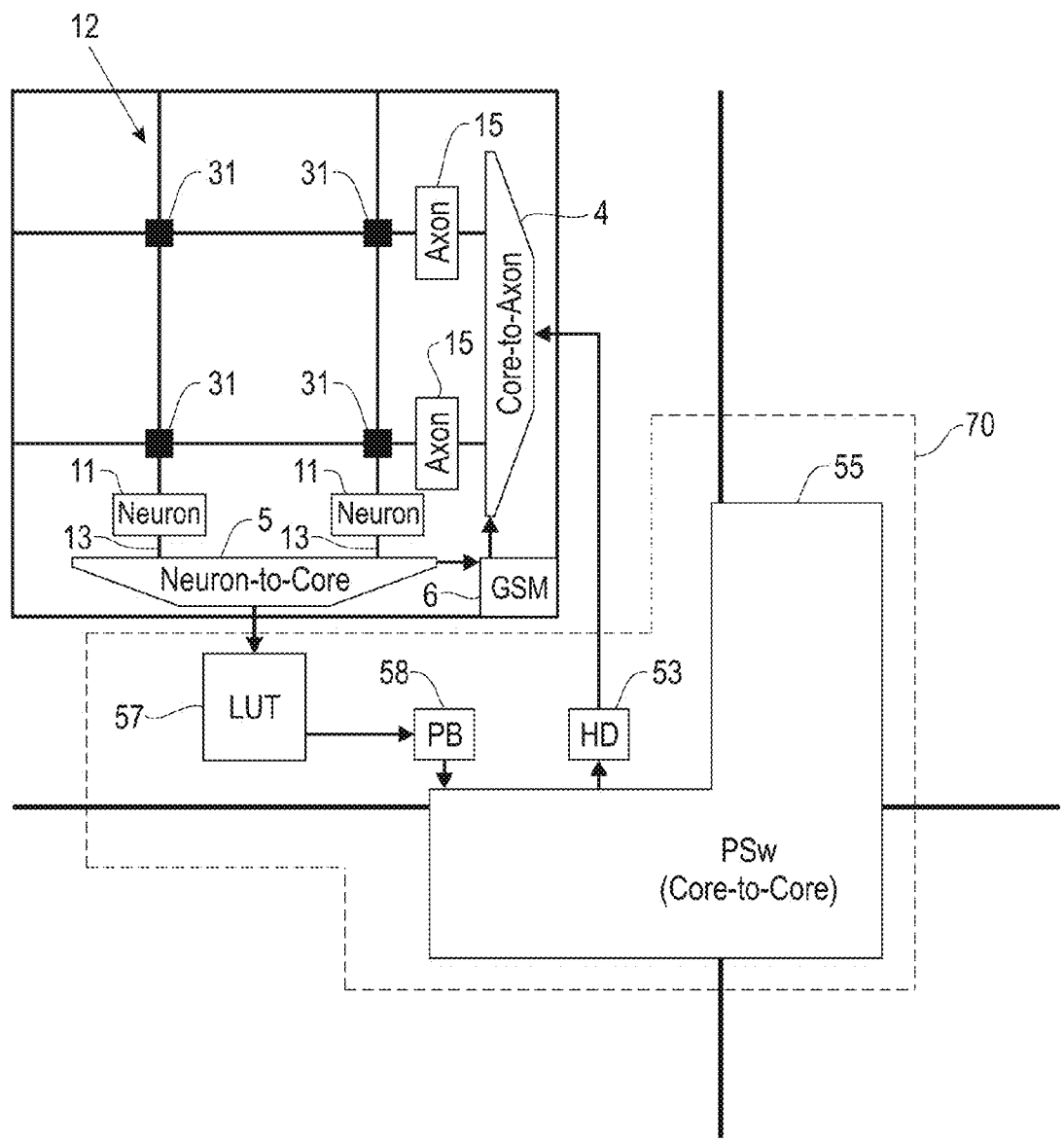
FIG. 1 illustrates an example core circuit, in accordance with an embodiment of the invention.

The present invention relates to neuromorphic and synaptronic computation, and in In one embodiment, the present invention provides a method comprising creating a structural description for at least one neurosynaptic core circuit. Each core circuit comprises an interconnect network including plural electronic synapses for interconnecting one or more electronic neurons with one or more electronic axons. The structural description defines a desired neuronal activity for the core circuits. The desired neuronal activity is simulated by programming the core circuits with the structural description. The structural description controls routing of neuronal firing events for the core circuits.

Another embodiment comprises a framework including at least one structural description for programming a neural network including multiple interconnected neural core circuits, wherein each core circuit comprises an interconnect network including plural electronic synapses for interconnecting one or more electronic neurons with one or more electronic axons. Each structural description defines a desired neuronal activity for at least one core circuit of the neural network. Each structural description controls the routing of neuronal firing events propagating through the neural network.

Each corelet comprises at least one constituent unit, wherein each constituent unit corresponds to one of the following: a portion of a core circuit, a core circuit, or another structural description.

Each structural description further defines an input mapping table including routing information for each input received by at least one corresponding core circuit, wherein, based on the input mapping table, each input received is mapped to an input of a constituent unit. An input of a constituent unit is an axon or an input of another structural description. Each input received by at least one corresponding core circuit is one of the following: an incoming neuronal firing event, or a sensory input from a sensory unit.

Each structural description further defines an output mapping table including routing information for each output generated by each constituent unit, wherein, based on the output mapping table, each output generated by each constituent unit is mapped to one of the following: an input of a constituent unit, or an output of at least one corresponding core circuit. An output of at least one corresponding core circuit is routed to one of the following: another structural description, or a motor unit. Each output generated by each constituent unit is an outgoing neuronal firing event.

A composer is configured to compose a structural description for one or more core circuits. Composing a structural description comprises specifying a number of constituent units, assigning an identifier to each constituent unit, mapping each input received by the one or more core circuits, and mapping each output generated by each constituent unit. Each input received is mapped to an input of a constituent unit. Each output generated is mapped to one of the following: an input of a constituent unit, or an output of the one or more corresponding core circuits.

A library maintains a collection of structural descriptions for different types of core circuits.

A decomposer is configured to decompose a structural description into a set of interconnected core circuits. Decomposing a structural description into a set of interconnected core circuits comprises hierarchically decomposing the structural description by replacing a level of indirection at each hierarchal level of the structural description, and generating a corresponding flat data file including information relating to the set of interconnected core circuits.

In one embodiment, the inputs received by the at least one core circuit are grouped into multiple groups of inputs, wherein each group comprises at least one input. The outputs generated by the at least one core circuit are grouped into multiple groups of outputs, wherein each group comprises at least one output. A group of outputs from the at least one core circuit is mapped to a group of inputs targeting one or more core circuits.

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

FIG. 1 illustrates an example core circuit 10, in accordance with an embodiment of the invention. The core circuit 10 comprises a plurality of electronic neurons 11 and a plurality of electronic incoming axons 15. The neurons 11 and the incoming axons 15 are interconnected via an m×n crossbar 12 comprising multiple electronic synapse devices ("synapses") 31, wherein m and n are integers greater than or equal to one. Each synapse 31 interconnects an incoming axon 15 to a neuron 11, wherein, with respect to the synapse 31, the incoming axon 15 and the neuron 11 represent an axon of a pre-synaptic neuron and a dendrite of a post-synaptic neuron, respectively.

Each neuron 11 receives firing events via interconnected incoming axons 15 and, in response to the firing events received, generates a firing event according to a neuronal activation function. For each neuron 11, the firing event generated by said neuron 11 propagates along a corresponding outgoing axon 13 of said neuron 11. A preferred embodiment for the neuronal activation function can be leaky integrate-and-fire.

In one embodiment of the invention, when neurons 11 generate a firing event, they maintain a postsynaptic-STDP (post-STDP) variable that decays. For example, in one embodiment, the decay period may be 50 ms. The post-STDP variable is used to achieve STDP by encoding the time since the last firing of an associated neuron 11. Such STDP is used to control long-term potentiation or "potentiation", which in this context is defined as increasing synaptic conductance. When incoming axons 15 generate a firing event, they maintain a presynaptic-STDP (pre-STDP) variable that decays in a similar fashion as that of neurons 11.

Pre-STDP and post-STDP variables may decay according to exponential, linear, polynomial, or quadratic functions, for example. In another embodiment of the invention, variables may increase instead of decrease over time. In any event, a variable may be used to achieve STDP by encoding the time since the last firing of an associated neuron 11. STDP is used to control long-term depression or "depression", which in this context is defined as decreasing synaptic conductance. Note that the roles of pre-STDP and post-STDP variables can be reversed with pre-STDP implementing potentiation and post-STDP implementing depression.

An external two-way communication environment may supply sensory inputs and consume motor outputs. The neurons 11 and incoming axons 15 are implemented using complementary metal-oxide semiconductor (CMOS) logic gates that receive firing events and generate a firing event according to the neuronal activation function. In one embodiment, the neurons 11 and incoming axons 15 include comparator circuits that generate firing events according to the neuronal activation function. In one embodiment, the synapses 31 are implemented using one-bit static random-access memory (SRAM) cells. Neurons 11 that generate a firing event are selected one at a time, and the firing events are delivered to target incoming axons 15, wherein the target incoming axons 15 may reside in the same core circuit 10 or somewhere else in a larger system with many core circuits 10.

As shown in FIG. 1, the core circuit 10 further comprises an address-event receiver (Core-to-Axon) 4, an address-event transmitter (Neuron-to-Core) 5, and a controller 6 that functions as a global state machine (GSM). The address-event receiver 4 receives firing events and transmits them to target incoming axons 15. The address-event transmitter 5 transmits firing events generated by the neurons 11 to the core circuits 10 including the target incoming axons 15.

The controller 6 sequences event activity within a time-step. The controller 6 divides each time-step into operational phases in the core circuit 10 for neuron updates, etc. In one embodiment, within a time-step, multiple neuron updates and synapse updates are sequentially handled in a read phase and a write phase, respectively. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

As shown in FIG. 1, the core circuit 10 further comprises a routing fabric 70. The routing fabric 70 is configured to selectively route neuronal firing events among core circuits 10. The routing fabric 70 comprises a firing events address lookup table (LUT) module 57, a packet builder (PB) module 58, a head delete (HD) module 53, and a core-to-core packet switch (PSw) 55. The LUT 57 is an N address routing table is configured to determine target incoming axons 15 for firing events generated by the neurons 11 in the core circuit 10. The target incoming axons 15 may be incoming axons 15 in the same core circuit 10 or other core circuits 10. The LUT 57 retrieves information such as target distance, direction, addresses, and delivery times (e.g., about 19 bits/packet×4 packets/neuron). The LUT 57 converts firing events generated by the neurons 11 into forwarding addresses of the target incoming axons 15.

The PB 58 packetizes the routing information retrieved by the LUT 57 into outgoing address-event router packets. The core-to-core PSw 55 is an up-down-left-right mesh router configured to direct the outgoing address-event router packets to the core circuits 10 containing the target incoming axons 15. The core-to-core PSw 55 is also configured to receive incoming address-event router packets from the core circuits 10. The HD 53 removes routing information from an incoming address-event router packet to deliver it as a time-stamped firing event to the address-event receiver 4.

Figure 2:
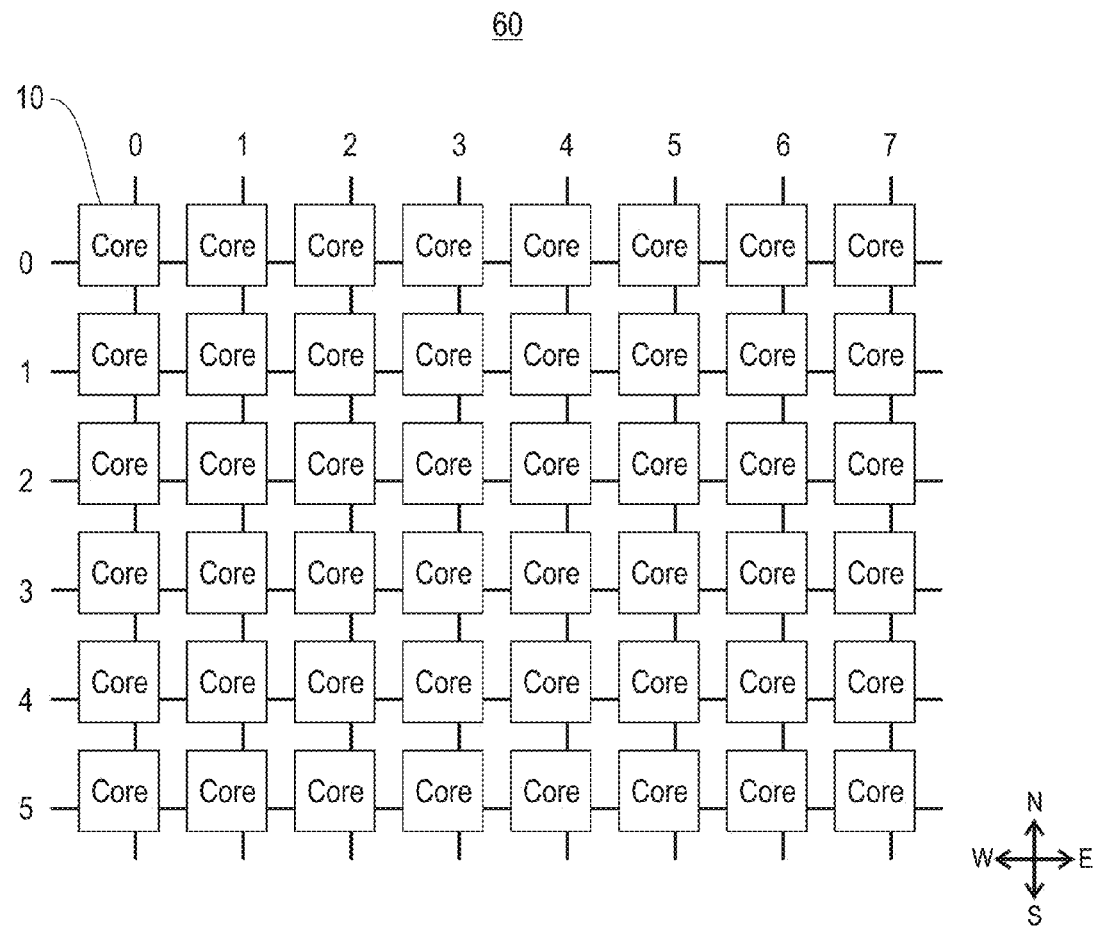
FIG. 2 illustrates an example neural network circuit including multiple interconnected core circuits, in accordance with an embodiment of the invention.

FIG. 2 illustrates a neural network circuit 60 including multiple interconnected core circuits 10, in accordance with an embodiment of the invention. The core circuits 10 are arranged in a 6×8 array. Each core circuit 10 may be identified by its Cartesian coordinates as core (i, j), where i is a column index and j is a row index in the array (i.e., core (0,0), core (0,1), . . . , core (5,7)). Each synapse 31 and neuron 11 have configurable operational parameters.

Each core circuit 10 utilizes its core-to-core PSw 55 (FIG. 1) to pass along neuronal firing events in the eastbound, westbound, northbound, or southbound direction. For example, a neuron 11 (FIG. 1) in the core circuit (0,0) may generate a firing event for routing to a target incoming axon 15 (FIG. 1) in the core circuit (5,7). To reach the core circuit (5,7), the firing event may traverse seven core circuits 10 in the eastbound direction (i.e., from core (0,0) to cores (0,1), (0,2), (0,3), (0,4), (0,5), (0,6), and (0,7)), and five core circuits 10 in the southbound direction (i.e., from core (0,7) to cores (1, 7), (2, 7), (3, 7), (4, 7), and (5, 7)) via the core-to-core PSws 55 in the neural network 60.

Figure 3:
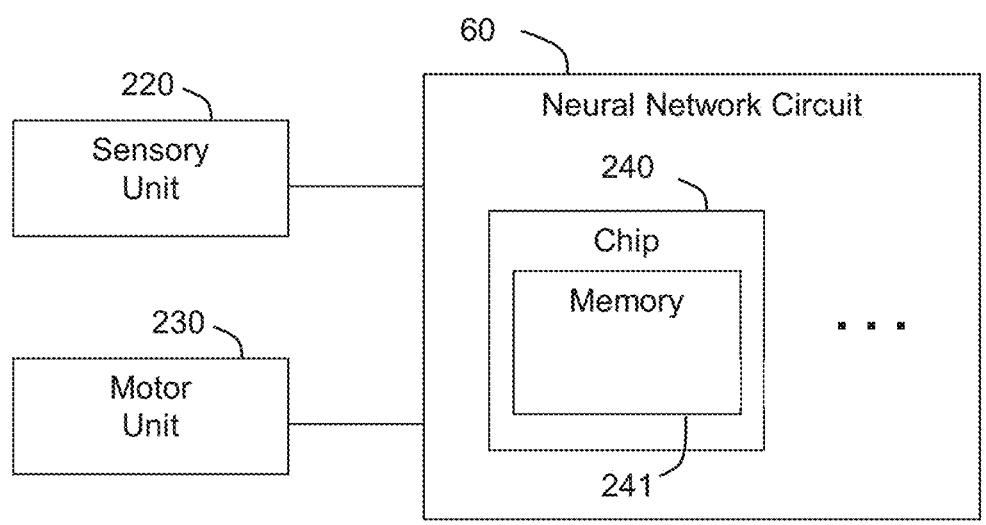
FIG. 3 illustrates a high-level block diagram of the neural network circuit in FIG. 2, in accordance with an embodiment of the invention.

FIG. 3 illustrates a high-level block diagram of the neural network circuit 60 in FIG. 2, in accordance with an embodiment of an invention. In one embodiment, the neural network circuit 60 is implemented using at least one multi-core circuit chip structure 240. Each chip structure 240 comprises multiple interconnected core circuits 10 (FIG. 2).

Figure 4:
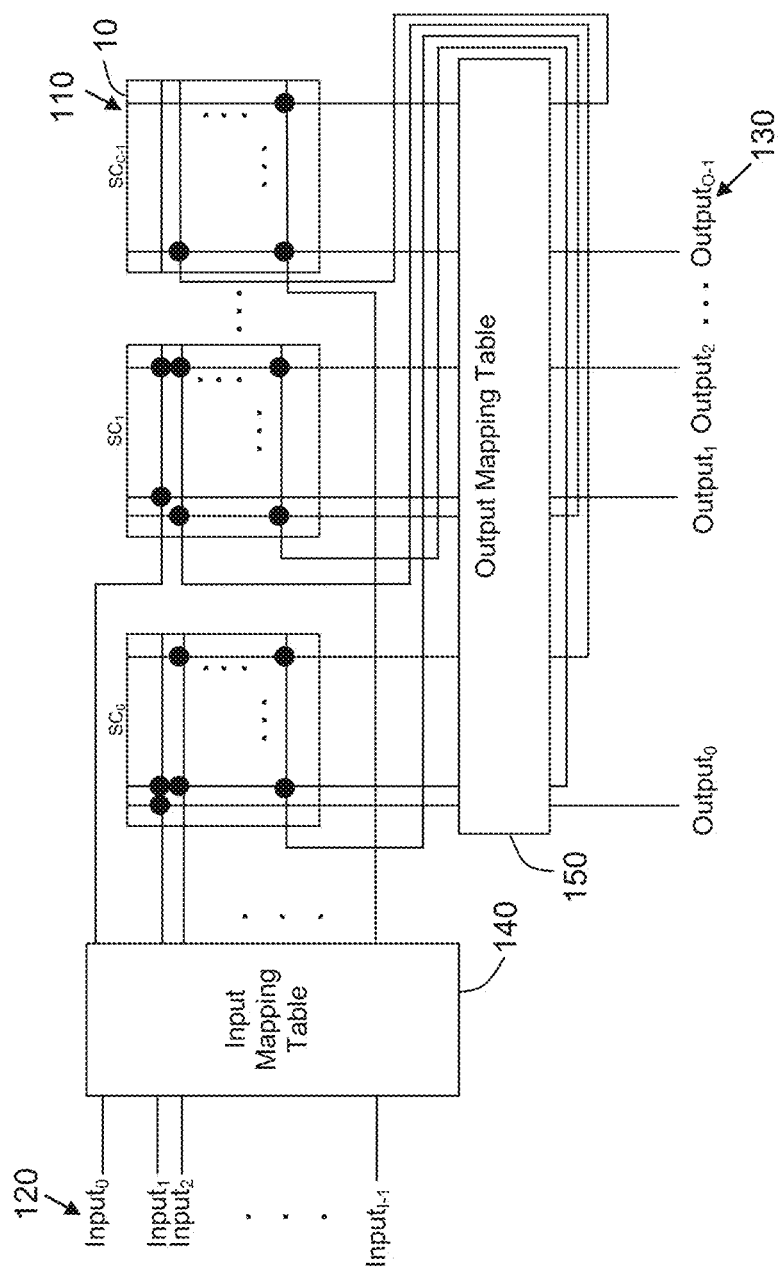
FIG. 4 illustrates a corelet for at least one core circuit, in accordance with an embodiment of the invention.

Each chip structure 240 may be programmed using a corelet 100 (FIG. 4). As described in detail later herein, a corelet 100 is a structural description of one or more core circuits 10. In one embodiment, a corelet 100 is a static configuration file for programming a portion (i.e., a fraction) of a core circuit 10, a core circuit 10, or at least two corelets 100 representing multiple interconnected core circuits 10.

Each chip structure 240 includes a memory unit 241. In one embodiment, a corelet 100 may be pre-loaded into the memory unit 241 of the chip structure 240.

As shown in FIG. 3, the neural network circuit 60 may be connected to external spiking systems such as sensory units 220 and motor units 230. A sensory unit 220 represents a sensory transducer configured to provide sensory input to the neural network circuit 60. In one embodiment, each sensor input is propagated to a target incoming axon 15 of the neural network circuit 60 as a firing event.

A motor unit 230 represents a motor control system configured to provide motor output. A motor unit 230 may generate motor output in response to firing events generated by one or more neurons 11 of the neural network circuit 60.

FIG. 4 illustrates a corelet 100 for at least one core circuit 10, in accordance with an embodiment of the invention. Corelets 100 are applicable to different types of neural core circuits. In one embodiment, a corelet 100 is a static configuration file for programming a portion (i.e., a fraction) of a core circuit 10 or a core circuit 10. Corelets 100 may also be composed in a hierarchical fashion, such that a corelet 100 may be used to program two or more corelets 100 representing multiple interconnected core circuits 10.

A corelet 100 may program the neuronal activity of a core circuit 10 of the neural network circuit 60. For example, a corelet 100 may be used to program the routing fabric 70 of each core circuit 10 of a chip structure 240. Other examples of activities a corelet 100 may program a core circuit 10 to perform include edge detection in image/video, motion history tracking in video, object classification, sense-response in a robotic environment, and sound filtering.

Figure 6:
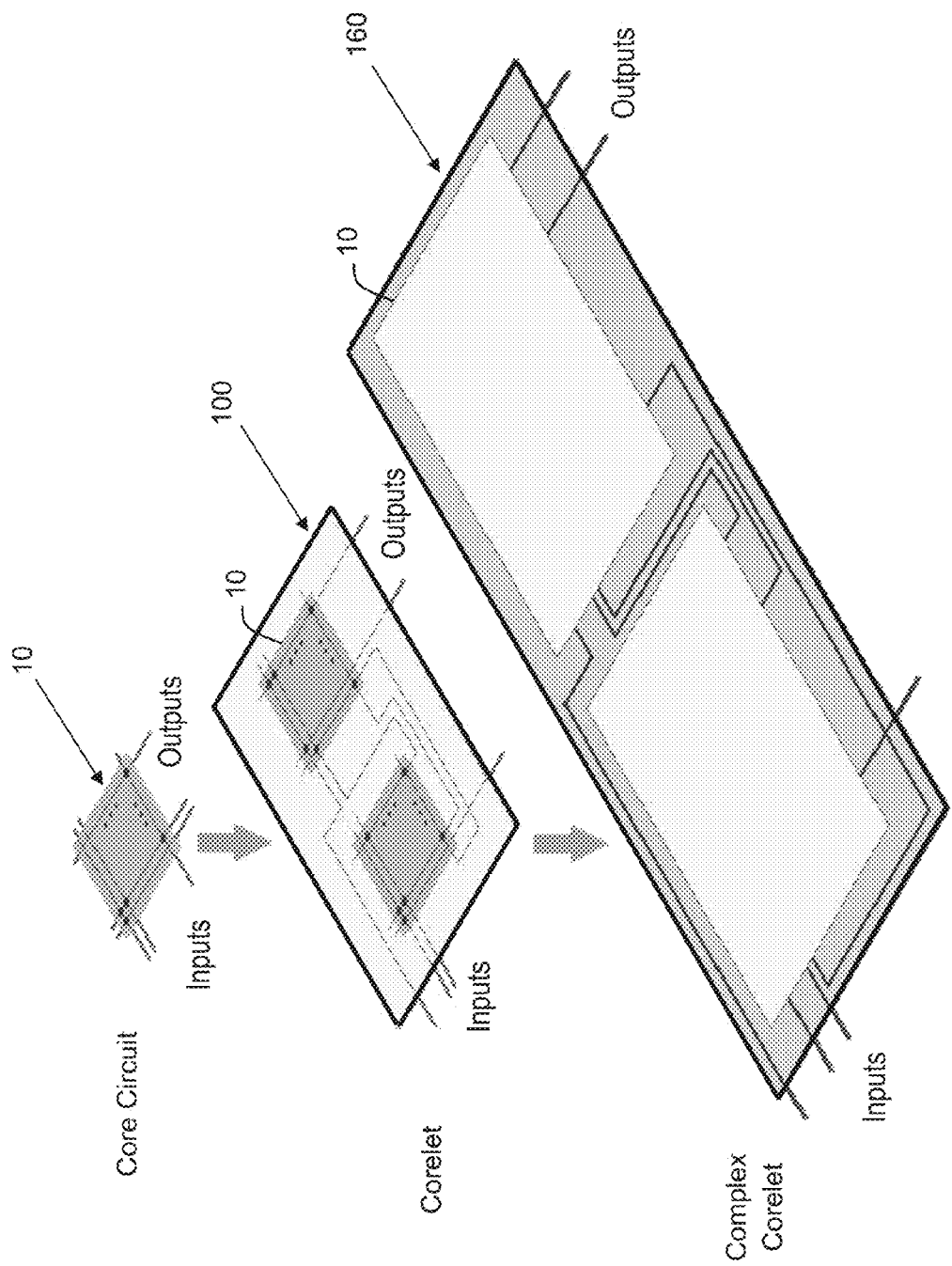
FIG. 6 illustrates a hierarchical composition of corelets, in accordance with an embodiment of the invention.

Each corelet 100 comprises C constituent units ("constituent sub-corelets") 110, wherein C is an integer greater than or equal to one. Each sub-corelet 110 defines one of the following: a portion (i.e., a fraction) of a core circuit 10, a core circuit 10, or a corelet 100 that in turn defines multiple interconnected core circuits 10. For example, each sub-corelet 110 in FIG. 4 is a core circuit 10. As another example, each sub-corelet 110 in FIG. 6 is a corelet 100.

All sub-corelets 110 of the corelet 100 are numbered. For example, each sub-corelet 110 may be identified by a corresponding index $SC_i$, wherein $0 \leq i \leq C-1$.

The corelet 100 receives I inputs 120, wherein I is an integer greater than or equal to one. Each input 120 may represent a firing event from another corelet 100 or a sensory input from a sensory unit 220. All inputs 120 received by the corelet 100 are addressed. For example, each input 120 may be addressed by a corresponding index $Input_j$, wherein $0 \leq j \leq I-1$.

The corelet 100 generates O outputs 130, wherein O is an integer greater than or equal to one. Each output 130 may represent a firing event generated by a neuron 11 of a sub-corelet 110. Each output 130 may be routed to another corelet 100 or a motor unit 230. All outputs 130 generated by the corelet 100 are addressed. For example, each output 130 may be addressed by a corresponding index $Output_k$, wherein $0 \leq k \leq O-1$.

The corelet 100 further comprises an input mapping table 140 and an output mapping table 150. In one embodiment, each table 140, 150 is a routing table that maintains routing information. As described in detail later herein, the input mapping table 140 maintains routing information for each input 120 received by the corelet 100. Based on the input mapping table 140, each received input 120 is mapped to an input of a sub-corelet 110 within the corelet 100. If each sub-corelet 110 is a core circuit 10, each received input 120 is mapped to a target incoming axon 15. If each sub-corelet 110 is a corelet 100, each received input 120 is mapped to an input 120 of a corelet 100.

As described in detail later herein, the output mapping table 150 maintains routing information for each output generated by each sub-corelet 110 of the corelet 100. If a sub-corelet 110 is a core circuit 10, the output generated by the sub-corelet 110 is a firing event. If a sub-corelet 110 is a corelet 100, the output generated by the sub-corelet 110 is an output 130. Based on the output mapping table 150, each output generated by a sub-corelet 110 is mapped to one of the following: an input of a sub-corelet 110 within the corelet 100 (e.g., a target incoming axon 15, or an input 120 of a corelet 100), or an output 130 of the corelet 100. As stated above, each output 130 is routed to another corelet 100 or a motor unit 230.

Figure 5:
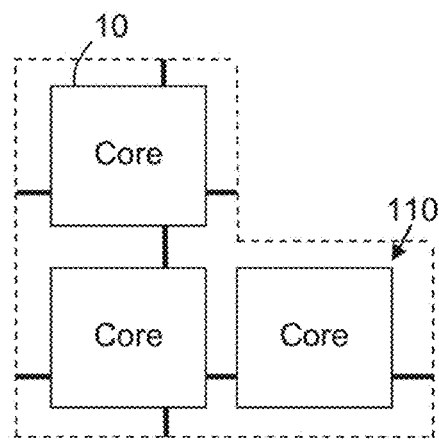
FIG. 5 illustrates an example corelet for three core circuits, in accordance with an embodiment of the invention.

FIG. 5 illustrates an example corelet 100 for three core circuits 10, in accordance with an embodiment of the invention. As shown in FIG. 3, the corelet 100 comprises three sub-corelets 110, wherein each sub-corelet 110 is a core circuit 10. In one embodiment, each core circuit 10 comprises a 256×256 ultra-dense crossbar 12 (FIG. 1) of synapses 31 (FIG. 1) that interconnects 256 neurons 11 (FIG. 1) with 256 incoming axons 15 (FIG. 1).

At maximum, the corelet 100 in FIG. 5 has about 768 (i.e., 256×3) inputs 120 (FIG. 4) and about 768 (i.e., 256×3) outputs 130 (FIG. 4). The number of inputs 120 and the number of outputs 130 may be less, depending on the interconnections between the sub-corelets 110 as determined by the input mapping table 140 (FIG. 4) and the output mapping table 150 (FIG. 4).

FIG. 6 illustrates a hierarchical composition of corelets 100, in accordance with an embodiment of the invention. Each corelet 100 is modular, reusable, and scalable. Corelets 100 may be combined to form a corelet 100. In one embodiment, a complex corelet 160 is a corelet 100 that is composed of at least two corelets 100. Complex corelets 160 are used to program multiple corelets 100 representing multiple interconnected core circuits 10.

Figure 7:
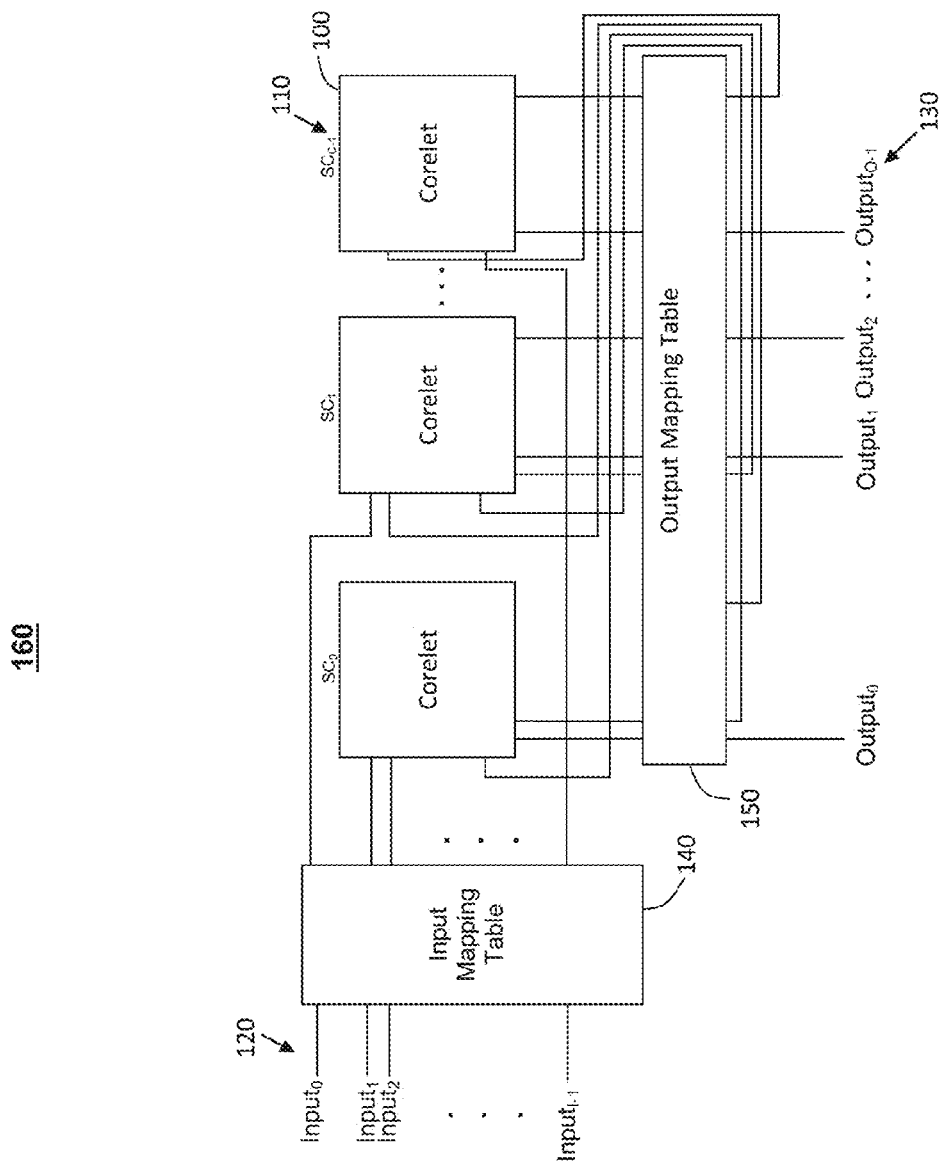
FIG. 7 illustrates a complex corelet for multiple corelets, in accordance with an embodiment of the invention.

FIG. 7 illustrates a complex corelet 160 for multiple corelets 100, in accordance with an embodiment of the invention. In one embodiment, a complex corelet 160 is composition of C corelets 100, wherein C is greater than or equal to 2. Each corelet 100 of the complex corelet 160 is a sub-corelet 110 of the complex corelet 160. All sub-corelets 110 of the complex corelet 160 are numbered. For example, each sub-corelet 110 may be identified by a corresponding index $SC_i$, wherein $0 \le i \le C-1$.

As stated above, a complex corelet 160 is a corelet 100. Therefore, the complex corelet 160 receives I inputs 120, and generates O outputs 130, wherein I and O are integers greater than or equal to one. The complex corelet 160 further comprises an input mapping table 140 and an output mapping table 150. Based on the input mapping table 140, each received input 120 is mapped to an input 120 of a corelet 100 within the complex corelet 160. Based on the output mapping table 150, each output 130 generated by a corelet 100 within the complex corelet 160 is mapped to one of the following: an input 120 of a corelet 100 within the complex corelet 160, or an output 130 of the complex corelet 160.

Figure 8:
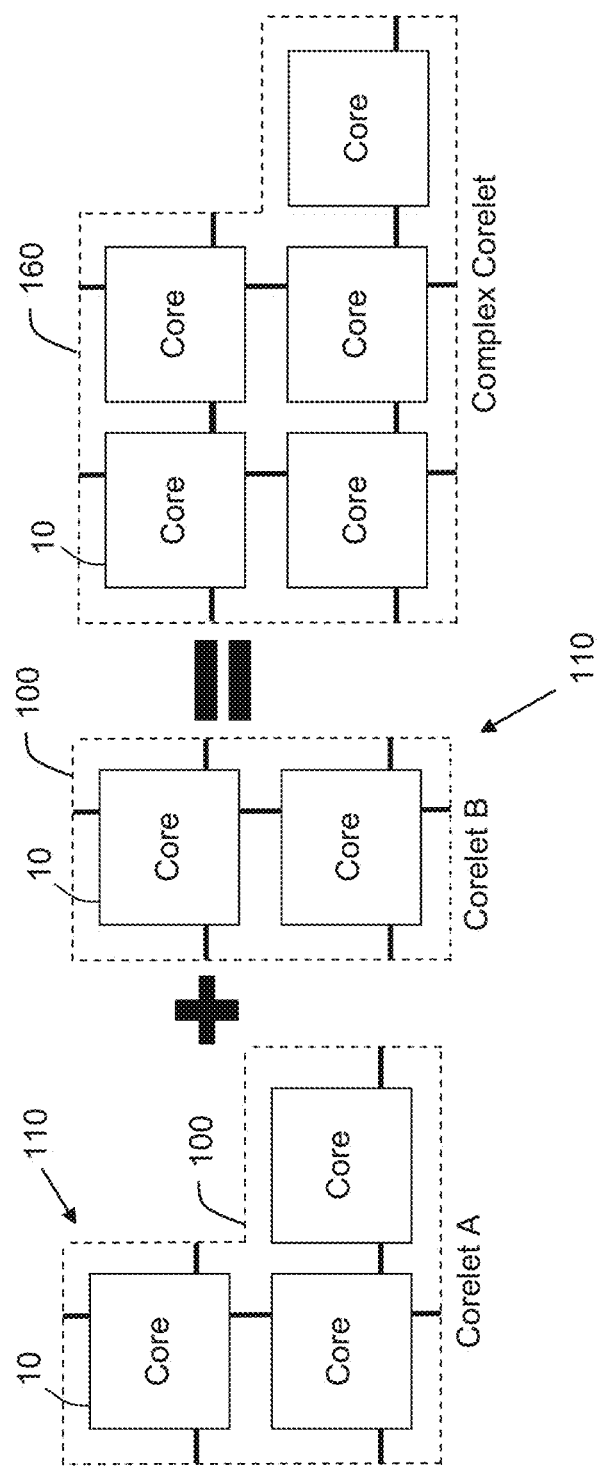
FIG. 8 illustrates an example complex corelet composed from two corelets, in accordance with an embodiment of the invention.

FIG. 8 illustrates an example complex corelet 160 composed from two corelets 100, in accordance with an embodiment of the invention. As shown in FIG. 8, the complex corelet 160 has two sub-corelets 110, wherein each sub-corelet 110 is a corelet 100. Specifically, the corelet 160 in FIG. 8 is composed of a first corelet 100 (Corelet A) and a second corelet 100 (Corelet B).

The first corelet 100 is configured for programming three interconnected core circuits 10. The second corelet 100 is configured for programming two interconnected core circuits 10. Therefore, the complex corelet 160 is configured for programming five interconnected core circuits 10.

In one embodiment, each core circuit 10 comprises a 256×256 ultra-dense crossbar 12 (FIG. 1) of synapses 31 (FIG. 1) that interconnect 256 neurons 11 (FIG. 1) with 256 incoming axons 15 (FIG. 1). At maximum, the first corelet 100 can have about 768 (i.e., 256×3) inputs 120 (FIG. 4) and about 768 (i.e., 256×3) outputs 130 (FIG. 4), and the second corelet 100 can have about 512 (i.e., 256×2) inputs 120 and about 512 (i.e., 256×2) outputs 130. Therefore, at maximum, the complex corelet 160 can have about 1280 (i.e., 256×5) inputs 120 and about 1280 (i.e., 256×5) outputs 130. The number of inputs 120 received by, and the number or outputs 130 generated by, the complex corelet 160 may be less, depending on the interconnections between the sub-corelets 110 as determined by the input mapping table 140 (FIG. 4) and the output mapping table 150 (FIG. 4).

Figure 9:
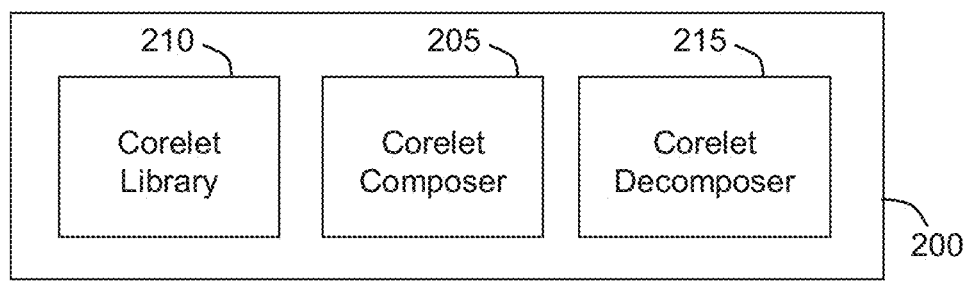
FIG. 9 is a high-level block diagram illustrating a framework for composing, decomposing, and maintaining corelets, in accordance with an embodiment of the invention.

FIG. 9 is a high-level block diagram illustrating a framework 200 for composing, decomposing, and maintaining corelets 100 (FIG. 4), in accordance with an embodiment of the invention. The framework 200 comprises a corelet library 210, a corelet composer 205, and a corelet decomposer 215. The corelet library 210 maintains an ever-growing collection of corelets 100. Each corelet 100 maintained in the corelet library 210 has corresponding documentation providing information relating to the inputs 120 received by the corelet 100, the outputs 130 generated by the corelet 100, the function of the corelet 100, and the cost of utilizing the corelet 100 to program a portion of a neural network circuit 60.

The corelet composer 205 is configured for composing complex corelets 160. The corelet decomposer 215 is configured for decomposing/deconstructing a corelet 100, and generating a corresponding data file that provides information relating to a set of interconnected core circuits 10 that the corelet 100 programs. In one embodiment, the corelet decomposer 215 outputs a flat JavaScript Object Notation (JSON) file that is suitable for use with cortical simulators.

FIG. 10 illustrates an example input mapping table 140, in accordance with an embodiment of the invention. As noted, based on the input mapping table 140 of a corelet 100, each input 120 received by the corelet 100 is mapped to an input of a sub-corelet 110 within the corelet 100. In one embodiment, the input mapping table 140 is an I-address routing table that maintains routing information for each received input 120. The input mapping table 140 comprises multiple entries 141, wherein each entry 141 corresponds to an input 120 of the corelet 100. Each entry 141 identifies an input of a sub-corelet 110 within the corelet 100 to which a corresponding input 120 should be routed. For example, as shown in FIG. 10, $Input_0$ received by a corelet 100 is routed to an input of a sub-corelet $SC_1$ of the corelet 100.

In one embodiment, the inputs 120 received by a corelet 100 are divided into multiple groups 142 of inputs 120, wherein each group 142 comprises at least one input 120. Each group 142 of inputs 120 may be further divided into multiple sub-groups of inputs 120.

FIG. 11 illustrates an example output mapping table 150, in accordance with an embodiment of the invention. In one embodiment, the output mapping table 150 of a corelet 100 is a routing table that maintains routing information for each output generated by each sub-corelet 110 of the corelet 100. The output mapping table 150 comprises multiple entries 151, wherein each entry 151 corresponds to an output of a sub-corelet 110 within the corelet 100. Each entry 151 identifies where a corresponding output generated by a sub-corelet 110 of the corelet 100 should be routed to.

In one embodiment, each output generated by a sub-corelet 110 of the corelet 100 is mapped to one of the following: an input of a sub-corelet 110 within the corelet 100, or an output 130 of the corelet 100. As stated above, each output 130 of the corelet 100 is routed to another corelet 100 or a motor unit 230. For example, as shown in FIG. 11, $Output_1$ generated by sub-corelet $SC_0$ of a corelet 100 is routed to an input of the sub-corelet $SC_1$. As another example, $Output_1$ generated by sub-corelet $SC_1$ of the corelet 100 is mapped to $Output_1$, an output 130 of the corelet 100.

In one embodiment, the outputs 130 generated by a corelet 100 are divided into multiple groups 152 of outputs 130, wherein each group 152 comprises at least one output 130. Each group 152 of outputs 130 may be further divided into multiple sub-groups of outputs 130.

In one embodiment, a group 152 of outputs 130 from a corelet 100 may be mapped to a group 142 of inputs 120 received by another corelet 100.

Figure 12:
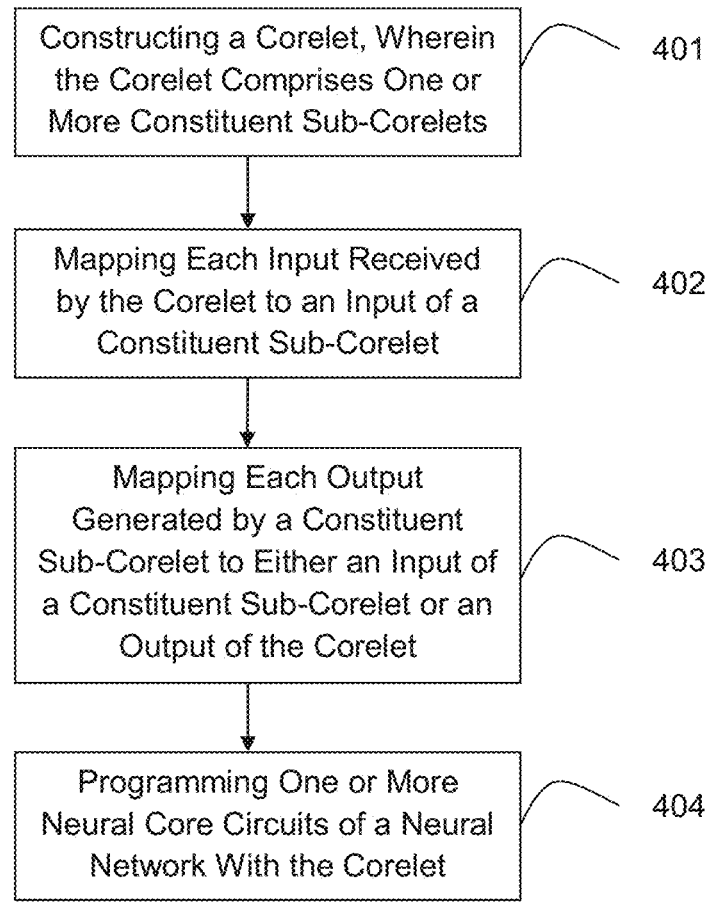
FIG. 12 illustrates a flowchart of an example process for programming a neural network, in accordance with an embodiment of the invention.

FIG. 12 illustrates a flowchart of an example process 400 for programming a neural network, in accordance with an embodiment of the invention. In process block 401, construct a corelet, wherein the corelet comprises one or more constituent sub-corelets. In process block 402, each input received by the corelet is mapped to an input of a constituent sub-corelet. In process block 403, each output generated by a constituent sub-corelet is mapped to either an input of a constituent sub-corelet or an output of the corelet. In process block 404, at least one neural core circuit of a neural network circuit is programmed with the corelet.

Figure 13:
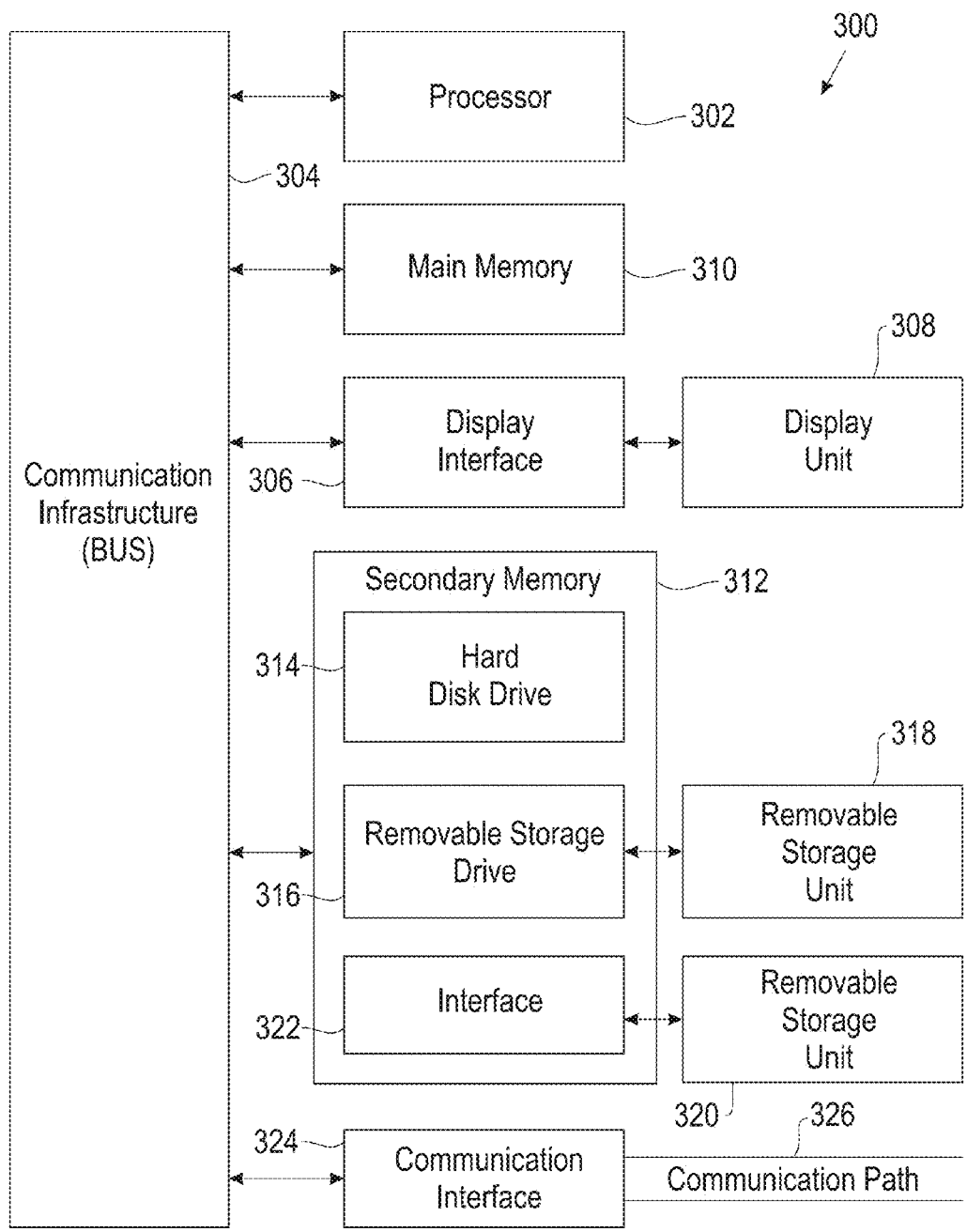
FIG. 13 illustrates a high-level block diagram showing an information processing system useful for implementing one embodiment of the present invention.

FIG. 13 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
generating a plurality of modular, reusable, scalable configurations, wherein each configuration comprises information corresponding to a portion of a neural network circuit and indicative of cost of utilizing the configuration to program the corresponding portion, at least one input received by the corresponding portion, at least output generated by the corresponding portion, and at least one function performed by the corresponding portion;
combining at least two of the configurations to form a complex configuration, wherein the complex configuration comprises a hierarchical arrangement of the at least two configurations; and
programming a multi-core circuit chip structure based on the complex configuration to simulate a plurality of interconnected neurosynaptic core circuits.

2. The method of claim 1, wherein each core circuit comprises a plurality of electronic synapses interconnecting a plurality of electronic neurons with a plurality of electronic axons.

3. The method of claim 1, wherein each configuration comprises at least one constituent unit, and each constituent unit corresponds to one of the following: a portion of a core circuit, a core circuit, or another configuration.

4. The method of claim 1, wherein each configuration is a static configuration file.

5. A system comprising a computer processor, a computer-readable hardware storage medium, and program code embodied with the computer-readable hardware storage medium for execution by the computer processor to implement a method comprising:
generating a plurality of modular, reusable, scalable configurations, wherein each configuration comprises information corresponding to a portion of a neural network circuit and indicative of cost of utilizing the configuration to program the corresponding portion, at least one input received by the corresponding portion, at least output generated by the corresponding portion, and at least one function performed by the corresponding portion;
combining at least two of the configurations to form a complex configuration, wherein the complex configuration comprises a hierarchical arrangement of the at least two configurations; and
programming a multi-core circuit chip structure based on the complex configuration to simulate a plurality of interconnected neurosynaptic core circuits.

6. The system of claim 5, wherein each core circuit comprises a plurality of electronic synapses interconnecting a plurality of electronic neurons with a plurality of electronic axons.

7. The system of claim 5, wherein each configuration comprises at least one constituent unit, and each constituent unit corresponds to one of the following: a portion of a core circuit, a core circuit, or another configuration.

8. A computer program product comprising a computer-readable hardware storage medium having program code embodied therewith, the program code being executable by a computer to implement a method comprising:
generating a plurality of modular, reusable, scalable configurations, wherein each configuration comprises information corresponding to a portion of a neural network circuit and indicative of cost of utilizing the configuration to program the corresponding portion, at least one input received by the corresponding portion, at least output generated by the corresponding portion, and at least one function performed by the corresponding portion;
combining at least two of the configurations to form a complex configuration, wherein the complex configuration comprises a hierarchical arrangement of the at least two configurations; and
programming a multi-core circuit chip structure based on the complex configuration to simulate a plurality of interconnected neurosynaptic core circuits.

9. The computer program product of claim 8, wherein each core circuit comprises a plurality of electronic synapses interconnecting a plurality of electronic neurons with a plurality of electronic axons.

10. The computer program product of claim 8, wherein each configuration comprises at least one constituent unit, and each constituent unit corresponds to one of the following: a portion of a core circuit, a core circuit, or another configuration.

* * * * *